United States Patent [19]

Byren

[11] Patent Number: 4,717,822
[45] Date of Patent: Jan. 5, 1988

[54] ROSETTE SCANNING SURVEILLANCE SENSOR

[75] Inventor: Robert W. Byren, Hermosa Beach, Calif.

[73] Assignee: Hughes Aircraft Company, Los Angeles, Calif.

[21] Appl. No.: 892,558

[22] Filed: Aug. 4, 1986

[51] Int. Cl.⁴ .......................... G02B 27/17; G01J 1/20
[52] U.S. Cl. ............................... 250/236; 250/203 R; 244/3.16
[58] Field of Search .................... 244/3.13, 3.16; 250/203 R, 236; 356/152

[56] References Cited

U.S. PATENT DOCUMENTS

| | | | |
|---|---|---|---|
| 3,203,305 | 8/1965 | Fairbanks | 250/203 R |
| 4,030,807 | 6/1977 | Briney | 244/3.16 |
| 4,039,246 | 8/1977 | Voigt | 244/3.16 |
| 4,413,177 | 11/1983 | Godwin, Jr. et al. | 244/3.16 |

Primary Examiner—Edward P. Westin
Assistant Examiner—Khaled Shami
Attorney, Agent, or Firm—Lewis B. Sternfels; A. W. Karambelas

[57] ABSTRACT

A pair of rotating gimbals (12, 14) independently nutate and precess the line-of-sight (24) of a sensor (22) to generate a rosette pattern (26).

16 Claims, 4 Drawing Figures

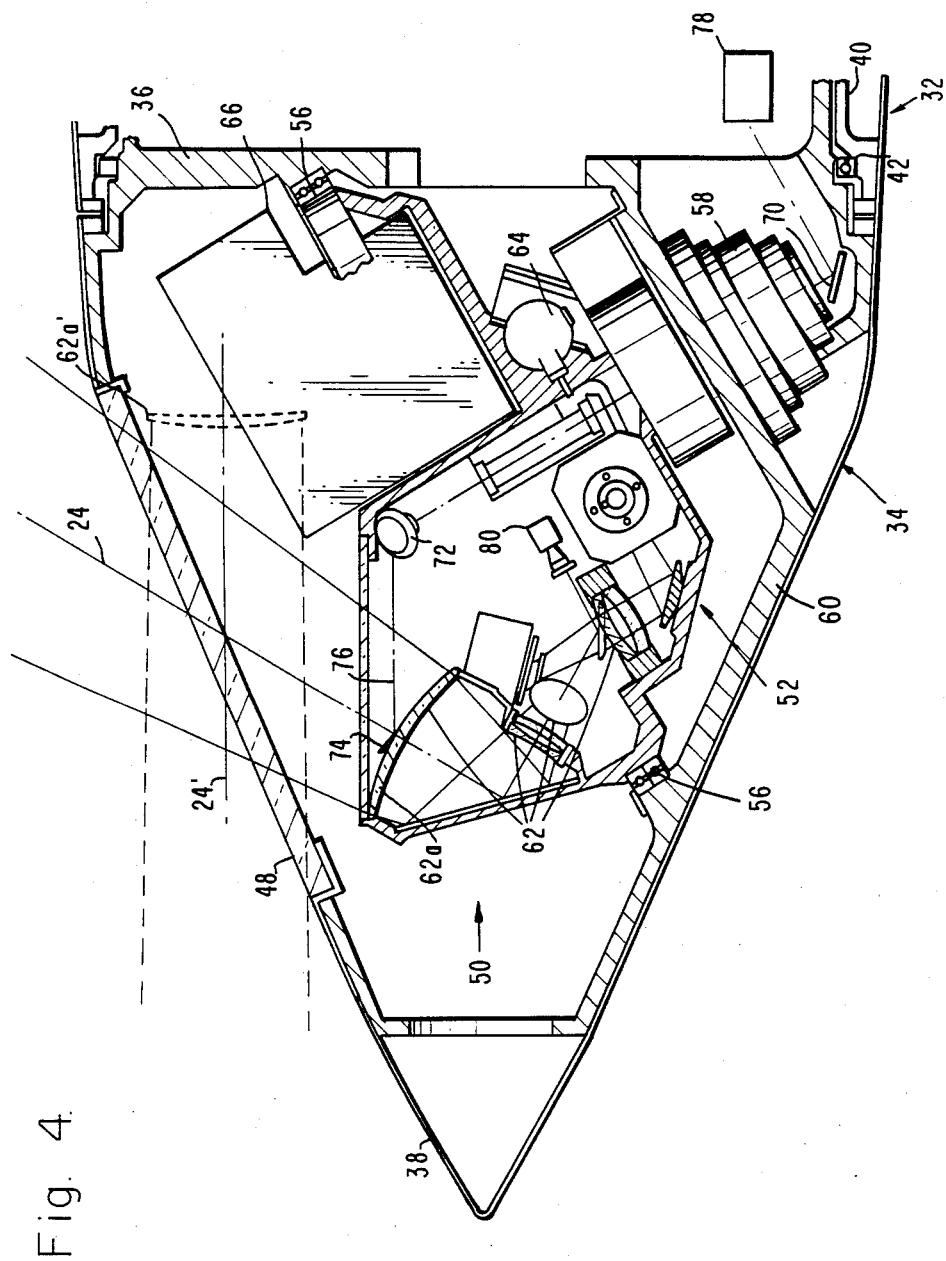

ROSETTE SCANNING SURVEILLANCE SENSOR

BACKGROUND OF THE INVENTION

The present invention relates to a scanning mechanism which produces a rosette scan pattern providing a sensor field of regard or search volume which is greater than a hemisphere.

While the present invention has particular use in infrared surveillance and tracking, e.g., a linear infrared detector array for infrared search and track (IRST) applications, it is to be understood that the invention is not to be limited to this specific use or form of electromagnetic energy.

Conventional infrared search and track systems use roll-stabilized azimuth scanners to provide contiguous coverage of a limited field-of-regard near the horizon and ahead of the vehicle in which they are housed, such as in an aircraft.

Present applications require surveillance sensors that are capable of scanning over extended fields of regard in a time efficient manner. One current approach, the radial bar scan pattern, is a straightforward approach to satisfying these requirements and provides improved scan efficiency over the roll-stabilized azimuth scanner.

The mechanism for producing a radial bar scan is capable of providing contiguous hyperhemispherical coverage. The scan pattern is generated with a two-gimbal set, which is oscillated about a pitch axis and is stepped about its roll axis. The advantages of the radial bar scan concept are its simple gimbal system, a sensor field-of-view which does not rotate relative to the scan direction, and a constant scan rate. Its primary disadvantages are the singularity point at the center of the scan and the low inherent scan efficiency, because its large gimbals must be stepped in roll and reversed in pitch for every bar. This concept also requires a large optical window to accommodate translation of the aperture in the pitch direction, assuming that the window is located on and rotates with the roll gimbal.

Another approach, the rosette scan pattern, is also capable of providing hyperhemispherical coverage and offers numerous advantages over the radial bar scan pattern and its derivatives, including improved scan efficiency and scan flexibility for different operating modes. Rosette scan patterns currently are generated by a pair of rotating optical elements, each of which deflects incoming rays by the same angle. Conventional deflection elements include optical wedges or prisms, nutating mirrors, or off-center lenses.

Further discussion of these and other scan patterns and the mechanisms for generating them can be found in "The Infrared Handbook", William L. Wolfe and George J. Zissis, editors, prepared by The Infrared Information and Analysis (IRIA) Center, Environmental Research Institute of Michigan and prepared for the Office of Naval Research, Department of the Navy, Washington, D.C., 1978. Because rosette scan patterns are of particular interest in the present invention, reference is directed to the above publication, chapter 22, pages 46 through 56, and a rotating prism scan is described in chapter 10, pages 10 through 12.

There are several disadvantages of using conventional deflection element rosette scanners. One is that the field of view coverage is limited to a hemisphere, and the translation of the optical aperture requires a relatively large viewing window. As scanning progresses through the field of view, optical abberations arise due to defects either in the curvature of the conformal window or from defraction/obscuration at partitions in any segments of the window. Complex optical and/or electronic implementations are required to correct such optical abberations.

SUMMARY OF THE INVENTION

The present invention avoids or overcomes these and other deficiencies, drawbacks or problems of conventional mechanisms by utilizing a pair of rotating gimbals which independently nutate and precess the line-of-sight of the sensor to generate a stable rosette pattern.

Specifically, a first gimbal, mounted on a supporting vehicle, rotates about a precession or roll axis. A second gimbal is mounted on the first gimbal and rotates about an axis, called a nutation axis, which is angled with respect to the precession or roll axis, this offset angle termed an angle of precession. The sensor is fixed to the second gimbal and has a line-of-sight which is angled with respect to the nutation angle. The angle of nutation must be equal to the angle of precession to generate a rosette pattern. With proper selection of precession and nutation rates, a stable, contiguous scan occurs. In addition, other electro-optic mechanisms may be included in or combined with the above optical system.

Several advantages are derived from this mechanization. Its construction is simple and, therefore, it is relatively less costly and complex than conventional designs. The translation of the entrance aperture at the optical window is reduced as the detector field-of-view is scanned across the field-of-regard, to minimize optical abberations due to defects either in conformal window curvature or from diffraction/obscuration at segmented window partitions. Thus, these advantages as to cost are derived from the opto-mechanical simplicity of the scanning mechanism and the avoidance of complex optical and/or electronic mechanisms which are required in prior constructions to correct optical abberations resulting a large conformal window. In addition, gimbal torque requirements are minimized because both gimbals rotate at constant rates, consequently, to minimize weight and power of the torquer mechanisms.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 4 is a cross-sectional view of the FIG. 3 implementation to illustrate some of these and other aspects thereof.

DETAILED DESCRIPTION OF THE PREFERRED EMBODIMENT

Figure 1:
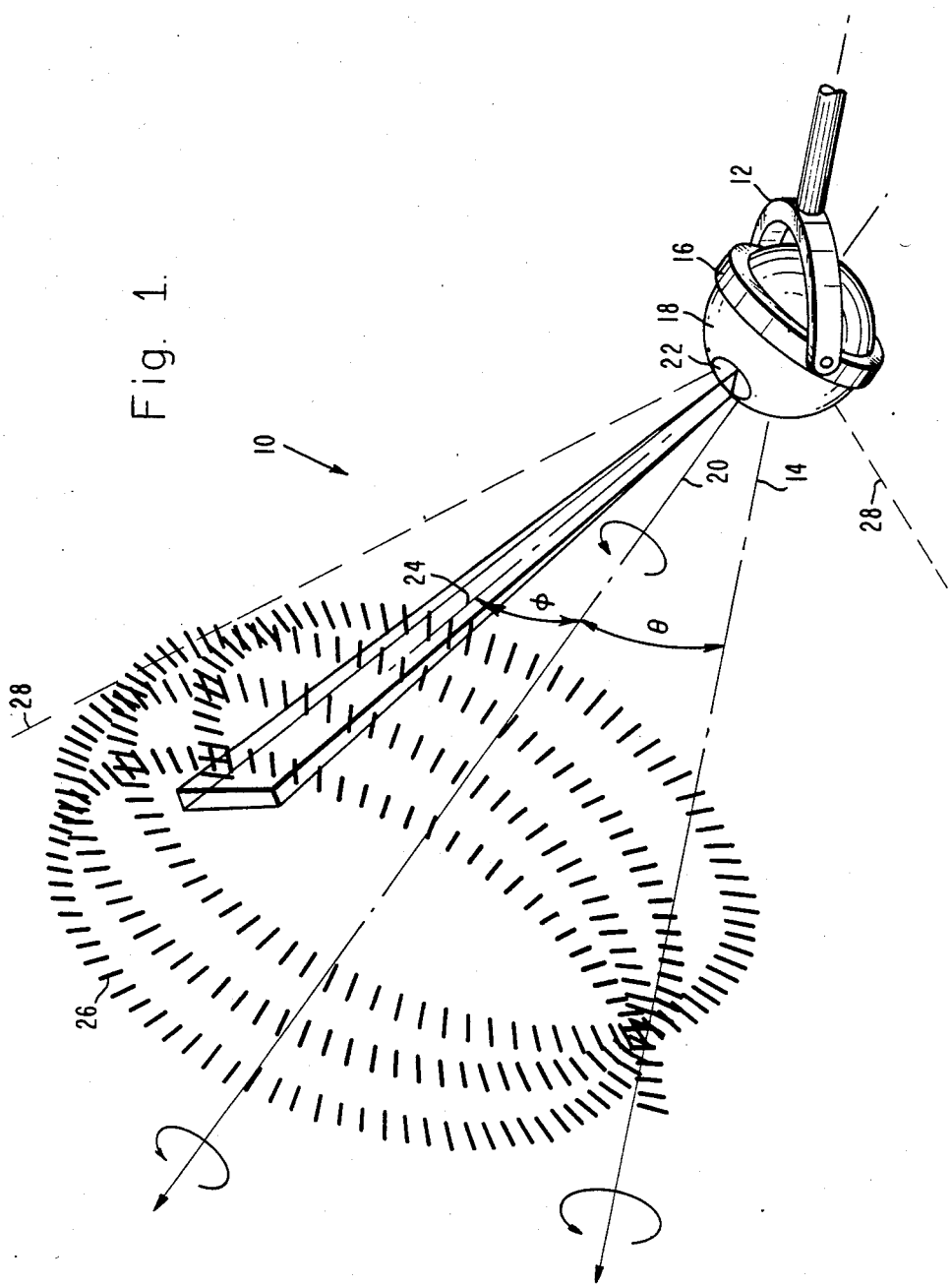
FIG. 1 is a simplified view depicting the concept of the present invention.
Figure 2:
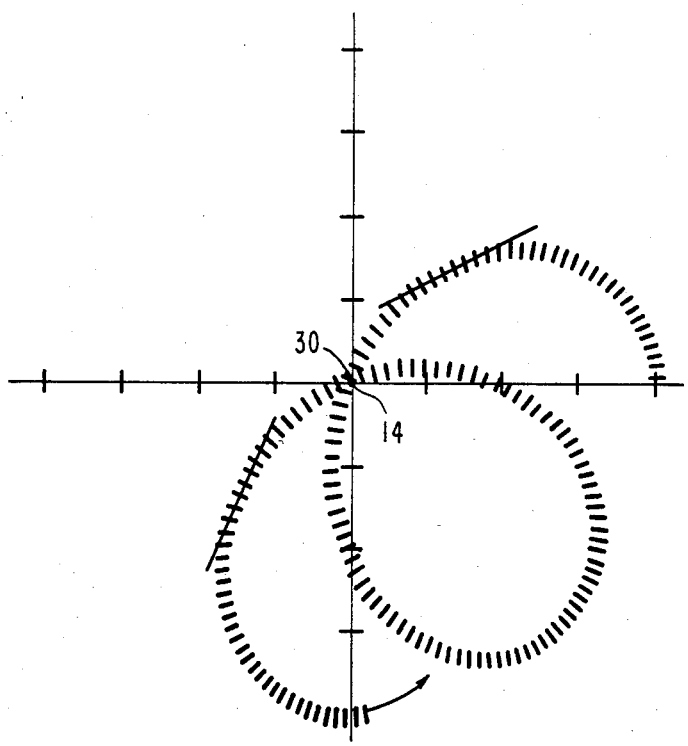
FIG. 2 illustrates a portion of the rosette scan pattern formed from use of the invention.

Accordingly, FIG. 1 illustrates a simplified implementation 10 of the present invention in which a gimbal 12, configured as a Y-shaped support, is rotated about a precession or roll axis for mounting in a stationary or movable vehicle, such as an aircraft, e.g., see FIG. 2.

Fixedly attached to gimbal 12 is a race or other rotational enabling support 16. Support 16 supports a gimballed device 18 which rotates about a nutation axis 20. Nutation axis 20 is angled from precession axis 14 by an angle $\theta$ of precession.

A sensor 22 is fixed with respect to gimballed device 18 and is provided with a line-of-sight 24 having an angle $\phi$ of nutation. It is important in the practice of the present invention that nutation angle $\phi$ be equal to precession angle $\theta$; otherwise, a rosette pattern would not be obtained. As gimbal support 12 and gimbal device 18 rotate about their respective axes 14 and 20, sensor 22 sweeps through a pattern 26 whose limits are defined by indicium 28. Depending upon the type of scan geometry desired, for given number of leaves on the rosette, the nutation and precession rates at which support 12 and device 18 rotate will determine how quickly and, conversely, densely the petals will be formed. FIG. 2 illustrates the formation of a rosette scan whose center is at point 30, and which lies on precession axis 14.

Figure 3:
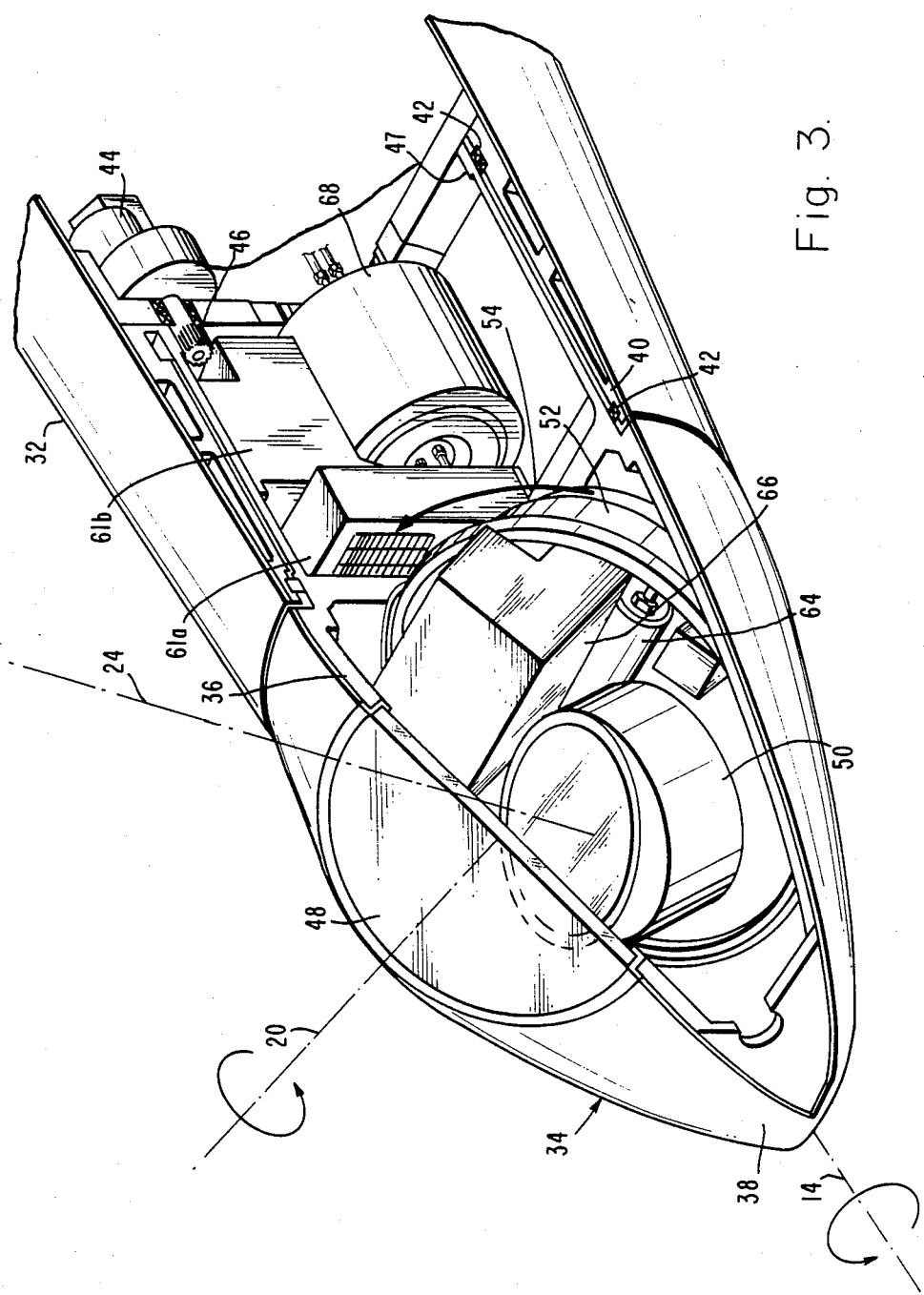
FIG. 3 is an example of one specific implementation of the concept incorporated in the nose section of an aircraft.

FIG. 3 depicts a specific implementation of the present invention carried by an airplane 32. This implementation is incorporated in and forms a part of a nose section 34 of the airplane which includes a frame 36 and a skin 38. Skin 38 is provided with an appropriate aerodynamic shape. The airplane has a bulkhead 40 on which frame 36 of nose section 34 is journalled by appropriate bearings 42. A roll drive motor 44 is secured to bulkhead 40 and is coupled to the nose section by appropriate gearing 46 and 47 to rotate the nose section about precession/roll axis 14.

An IR window 48 opens through the housing of nose section 34 for viewing by sensor optics 50 and an IR sensor housed within and rotatable with nose section 34. IR window 48 may be flat or curved or comprise a single optical element or several optical elements in a conformal configuration. The sensor, having line-of-sight 24, may be a linear array infrared detector operating in the 3–5 μm or 8–12 μm wavelength bands. Sensor optics 50 is affixed to and rotatable with a gimbal 52 in the direction of arrow-headed line 54. As shown in FIG. 4, gimbal 52 is supported by bearings 56 and is rotated by a direct current torque motor 58 within a support structure 60.

The specific components are of conventional construction. A heat exchanger 61a and signal electronics 61b are carried in bulkhead 32. Infrared sensor and optics 50 include a plurality of optical elements 62, in which lens 62a is the objective thereof, some of which are shown in FIG. 4, a detector/dewar/cryogenic cooler 64, and sensor electronic apparatus 66. Power forms, mode control commands and digitized video signals traverse the gimbal interface through a slipring/brushblock assembly 68 (see FIG. 3). Because objective lens 62a is angled at a substantially non-perpendicular angle to window 48, and to minimize the size of the window while, at the same, to utilize its area fully for passage of electromagnetic energy therethrough, the objective lens may be configured to conform the electromagnetic energy passing through it to the pattern of the electromagnetic energy passing through window 48. Thus, a flat window would have an elliptical energy pattern thereon; consequently, lens 62a could be elliptically configured.

Other electro-optical apparatus, typified by optical elements 70, 72, 74 and their line-of-right 76, shown in FIG. 4, may be included within nose cone 34. One example of such apparatus is a laser range finder, which uses an off-gimbal laser transmitter 78 and an on-gimbal shared-aperture receiver 80. Another example of such apparatus is a laser range finder, which uses an off-gimbal laser transmitter 78 and an on-gimbal shared-aperture receiver 80. Another example of such other electro-optical apparatus is an imaging sensor, whether infrared or not, which is typified by an off-gimbal sensor depictable also by indicium 78 and where indicium 70 comprises a derotation element, such as a roof prism or a Pachan prism.

In the manner depicted in FIGS. 1 and 2, as nutation gimbal 52 rotates, line-of-sight 24 of infrared sensor 50 traces a cone in space whose positions at two representative half revolutions are shown by the full and dashed illustrations of objective 62a and 62a', respectively, and their corresponding lines-of-sight 24 and 24'. Since the nutation gimbal is mounted on the roll gimbal defined by bearings 42, as mounted on bulkhead 40 of aircraft 32, as the roll gimbal rotates, the nutating line-of-sight precesses about roll axis 14, thus generating a rosette pattern. Because the optical axis, which defines the center of the aperture, always projects through the same point of window 48, the physical size of the window can be minimized. Also, because the roll and nutation gimbals rotate at a constant rates, the requirements for torque are relatively at a steady-state, which eliminate the need for heavy-duty torquing mechanisms.

Although the invention has been described with reference to a particular embodiment, it will be understood that other changes and modifications may be made therein without departing from the spirit and scope of the invention.

What is claimed is:

1. In an aircraft having a roll axis and including a window, a rosette scan surveillance and tracking apparatus providing a hyper-hemispherical field-of-regard, comprising:
   first means rotatable about a precession axis which is coaxial with the roll axis;
   second means rotatable about a nutation axis which is angled from the precession axis at a first angle;
   a sensor having a field-of-view rotatable with said second means and having a line-of-sight on a line-of-sight axis which intersects with the nutation axis at an intersection and is angled therefrom by an angle equal to the first angle; and
   means positioning the intersection of the line-of-sight axis and the nutation axis with respect to the window for minimizing the size thereof.

2. An apparatus according to claim 1 further comprising means for rotating said first and second means at respective frequencies which are correlated to provide specified rates and accuracies of scan.

3. An apparatus according to claim 1 in which said second means is mounted on said first means.

4. An apparatus according to claim 1 in which said sensor is mounted on said second means.

5. An apparatus according to claim 1 in which said second means is mounted on said first means and said sensor is mounted on said second means.

6. An apparatus according to claim 1 in which said sensor is mounted on said first means, and further including relay optics and derotation optics mounted on said second means to relay the line-of-sight to said sensor.

7. An apparatus according to claim 1 in which said second means is mounted on said first means and further including relay optics and derotation optics mounted on said second means to relay the line-of-sight to said sensor.

8. An apparatus according to claim 1 in which said first means comprises a nose section secured to and journalled on said aircraft and rotatable about the precession/roll axis and supporting said window for enabling electromagnetic energy to be communicated between the interior and the exterior of said nose section, said second means and said sensor being housed within said nose section.

9. An apparatus according to claim 8 further comprising means for rotating said first and second means at respective frequencies which are correlated to provide specified rates and accuracies of scan.

10. An apparatus according to claim 8 in which said second means is mounted on said first means.

11. An apparatus according to claim 8 in which said sensor is mounted on said second means.

12. An apparatus according to claim 8 in which said second means is mounted on said first means and said sensor is mounted on said second means.

13. An apparatus according to claim 8 in which said second means comprises a gimbal.

14. An apparatus according to claim 8 further comprising electro-optical apparatus additional to and functionally independent from said first and second means and said sensor contained within said nose section for providing additional electro-optical functions accessible through said window.

15. An apparatus according to claim 14 in which said additional electro-optical apparatus comprises a laser range finder or an imaging sensor.

16. An apparatus according to claim 8 wherein the line-of-sight of said sensor is directed at a substantially non-perpendicular angle to said window, such that the electromagnetic energy defines a non-circular pattern on said window, and wherein said sensor includes an objective lens having a curvature which conforms the electromagnetic energy thereon to the pattern on said window.

* * * * *